Dec. 10, 1963   E. H. CABANISS ETAL   3,114,046
POSITION MEASURING SYSTEM
Filed Aug. 1, 1960   3 Sheets-Sheet 1
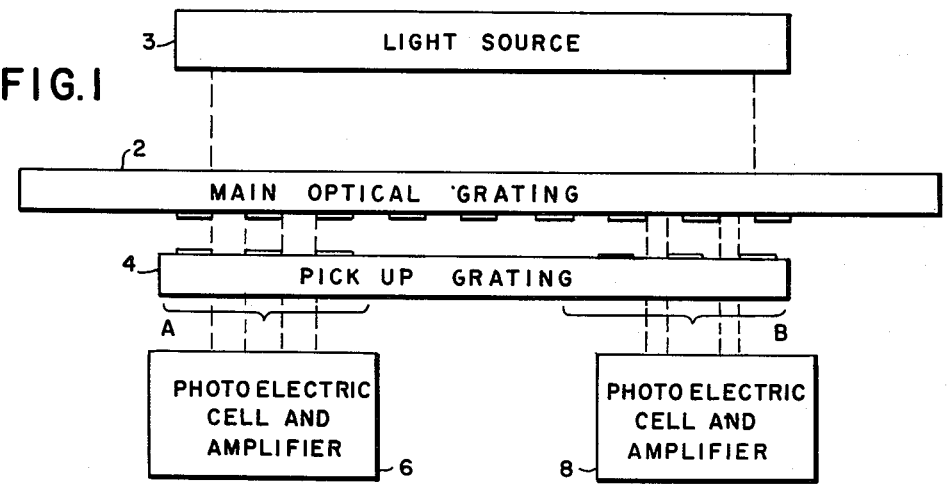
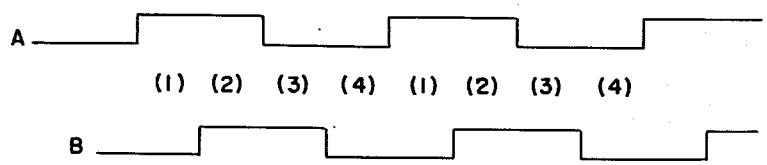
INVENTORS
EDWARD H. CABANISS
CONRAD J. ISAK
BY
*Isidore Match*
ATTORNEY

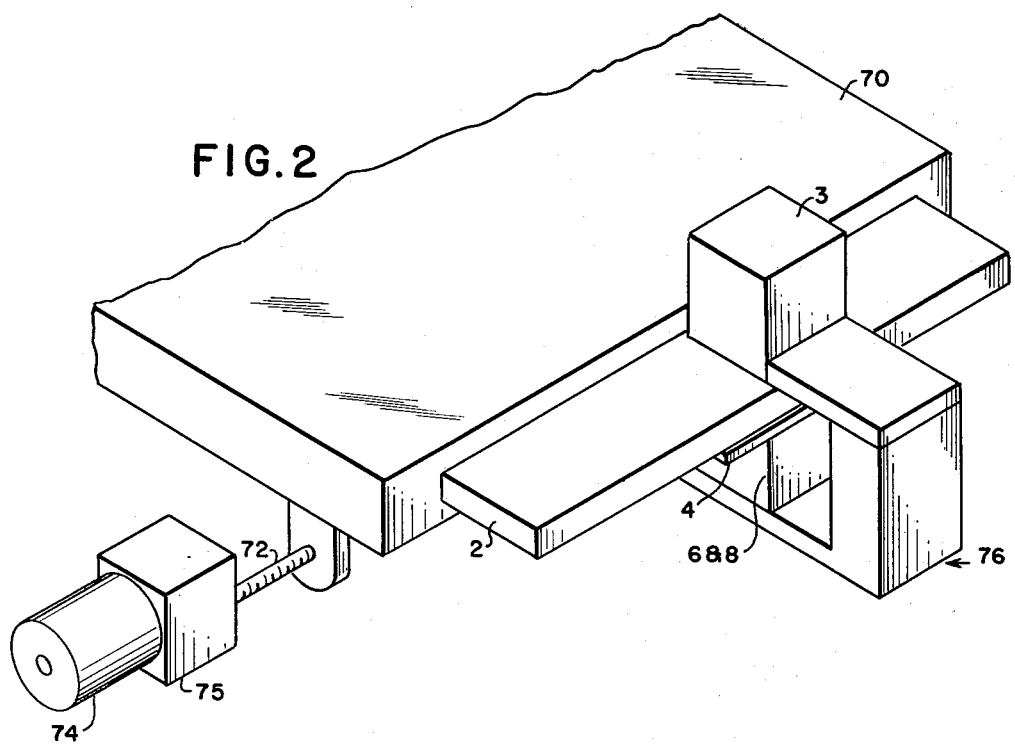
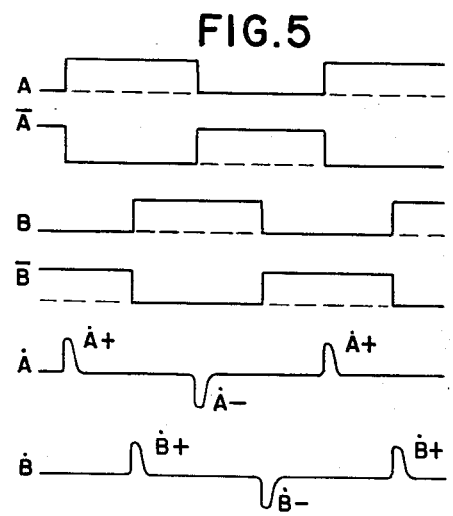
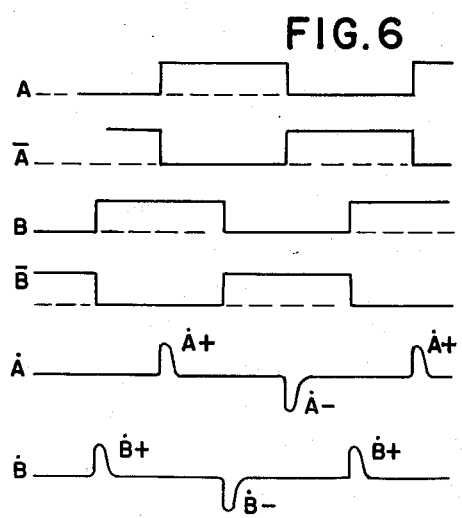

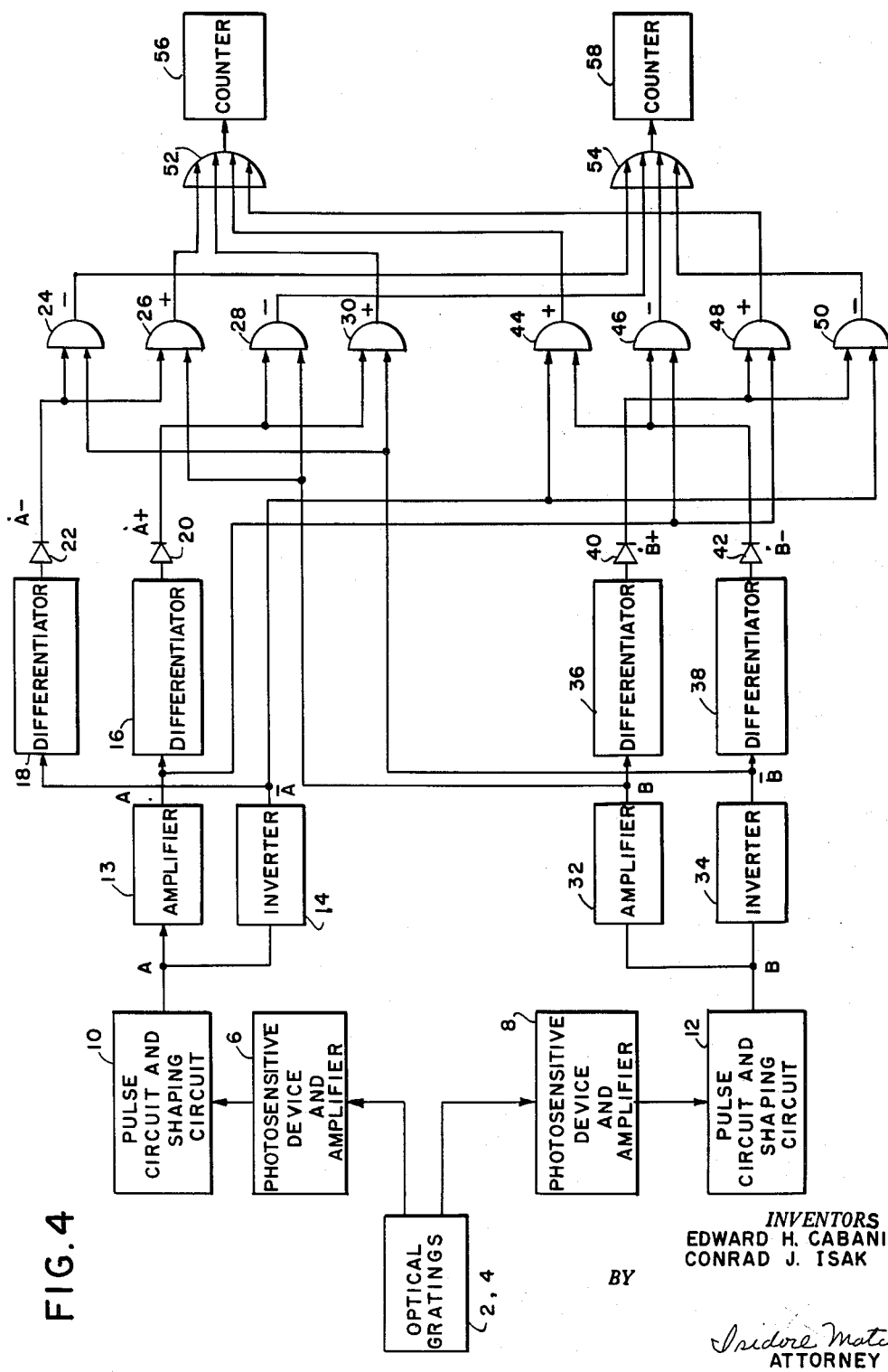

United States Patent Office 3,114,046
Patented Dec. 10, 1963

3,114,046
POSITION MEASURING SYSTEM
Edward H. Cabaniss, Schenectady, N.Y., and Conrad J. Isak, Waynesboro, Va., assignors to General Electric Company, a corporation of New York
Filed Aug. 1, 1960, Ser. No. 46,832
7 Claims. (Cl. 250—235)

This invention relates to position measuring systems. More particularly, it relates to circuits for providing indications representing degrees of movement from a reference position and the direction of such movement.

In situations where it is necessary to detect the quantity of relative distance moved in either of opposite directions, it is also necessary to detect the direction of the motion. This type of detection may be described as "position by departure" measurement, such type of measurement being used quite extensively in digital systems such as in machine tool control programs. The quantity of distance moved may be determined by counting a series of pulses developed for each unit of motion, these pulses being obtained, for example, when a contact brush in response to such motion moves sequentially across a series of energized commutator bars. A train of pulses may also be obtained by electrically sensing the light variations caused by the interference of two optical type gratings (or rulings). In these types of measuring systems, to derive the pulse train, the electricad pick-up devices which may be utilized are a commutator, and wherein optical type gratings are utilized, photo-electric cells, etc.

Heretofore, in prior art systems utilized for this type of measurement, $n$ counts, i.e., pulses representing increments in a unit of motion are derived from $n$ pick-ups. For example, two pick-ups provide two counts or two increments for each unit of motion, etc. The derivation of only $n$ counts for $n$ pick-ups provides relatively unsatisfactory resolution of the basic measuring device.

It is, accordingly, an important object of this invention to provide a circuit for measuring position by departure wherein there is provided an indication of the direction of motion.

It is another object to provide a circuit in accordance with the preceding object wherein there is produced two $n$ counts or increments for each unit of motion when $n$ pick-up devices are utilized.

Generally speaking and in accordance with the invention, there is provided in combination, means responsive to motion of a member from a reference position to a different position to produce like electrical wave trains spaced ½$n$ wavelength apart, a wave representing a unit of motion. Means are included for deriving a series of 2$n$ pulses in response to a unit of motion by the member which comprises first means for deriving a pulse at each ½$n$ wavelength point only when the motion is in one direction and second means for deriving a pulse at each ½$n$ wavelength point only when the motion is in the opposite direction.

The features of this invention, which are believed to be new, are set forth with particularity in the appended claims. The invention itself, however, may best be understood by reference to the following description when taken in conjunction with the accompanying drawings which disclose an embodiment of a circuit according to the invention.

In the drawings, FIG. 1 is a schematic depiction of a pair of optical gratings utilized for sensing motion, together with a pair of associated pick-ups;

FIG. 2 is a three dimensional view of an arrangement of a practical embodiment of the gratings depicted in FIG. 1;

FIG. 3 is a diagram of the waveforms provided at the outputs of the pickups of FIG. 1 and indicates their phase relationships;

FIG. 4 is a block diagram of a circuit in accordance with the invention;

FIG. 5 is a timing diagram of the waveforms present in the circuit during positive motion; and FIG. 6 is a timing diagram of the waveforms present in the circuit during negative motion.

Considering the problem presented by the sensing of direction of movement, it is to be realized that the determining of the sequence of only two events is insufficient to enable such sensing. Thus, if X is chosen to designate a first event and Y is chosen to designate a second event, the sequence . . . X Y X Y X Y . . . cannot be distinguished from . . . Y X Y X Y X . . ., i.e., whether one moves to the right or to the left in this sequence, the same arrangement is encountered. Direction sensing, however, can be accomplished by determining the sequence of three or more events, i.e., if Z is chosen to designate a third event, the sequence . . . X Y Z X Y Z X Y Z . . ., can be distinguished from . . . Z Y X Z Y X Z Y X . . . . In the latter situation, movement to the right will encounter an entirely different arrangement from movement to the left and there can be no ambiguity.

In view of the foregoing, it is clear that to provide three electronic events, there is required at least a ternary device or if binary devices are utilized, there are required at least two binary devices.

Referring now to FIG. 1, there is shown an optical system using two optical gratings. It is seen that the rulings on the opposed main optical grating 2 and pick-up grating 4 at the area B associated with pick-up device 8, are so displaced that the output of pick-up 8 is shifted ¼ wavelength with respect to the output of pick-up 6, i.e., the light from light source 3 passing through the area of the gratings associated with pick-up 8 permits a maximum transmission of light ¼ of a wavelength later than the A area of the gratings associated with pick-up 6. If pick-ups 6 and 8 comprise photoelectric cells for sensing the light transmitted through the gratings and a device such as a Schmitt trigger is respectively utilized for converting the output of each photoelectric cell to pulses and then shaping the pulses into rectangular waves, the waveforms are displaced ¼ of a wavelength in phase. Optical gratings 2 and 4 may be of a type well known in the art and further description thereof, is deemed unnecessary.

In FIG. 2, a moving member such as a machine tool table 70 which may threadedly be moved along a spindle 72 in response to the actuation of a motor 74 and associated gear box 75 has attached thereto, main optical grating 2 and pick-up grating 4 whereby they are maintained in a chosen registration. A bracket generally designated by numeral 76 and immovably positioned by a suitable member (not shown) includes light source 3 disposed above main optical grating 2 and pick-up devices 6 and 8 disposed under pick-up grating 4.

In the operation of the device, tracing the events which occur in FIG. 3 from left to right, it is seen that there are four sequentially occurring events, viz., (1) A high and B low, (2) A and B high, (3) A low and B high, and (4) A low and B low. If the occurrence of events tracing from left to right in FIG. 3, i.e., the sequence (1), (2), (3), and (4), is defined as positive motion, the sequence of events for negative motion is (4), (3), (2), and (1). If instead of two pick-ups, three pick-ups were utilized with the optical gratings of FIG. 1 and the gratings were so ruled that their outputs would be respectively displaced in phase one sixth of a wavelength, than a sequence of six events could be determined, etc. Thus, if $n$ pick-ups are utilized and their outputs are relatively displaced in phase ½$n$ wavelengths, 2$n$ events are determined.

The circuit of FIG. 4, in accordance with the invention, is an example of a two pick-up system which produces four events. Also, in this system, two $n$ pulses or increments of motion are produced for each unit of motion as well as an indication of the direction of the motion.

Prior to describing the structure and operation of a circuit of FIG. 4, the following quantities that are referred to therein are defined.

A. The variable output from a pick-up after suitable shaping thereof.

$\overline{A}$. Not A or the inverted value of A; when A is high, $\overline{A}$ is low, and when A is low, $\overline{A}$ is high.

$\dot{A}$. The derivative of A.

$\dot{A}-$. Negative going derivative pulse (positive after inversion).

$\dot{A}+$. Positive going derivative pulse.

The B quantities have the same definitions as the corresponding A quantities.

Referring now to FIG. 4, the optical gratings 2 and 4 may be a combination such as depicted in FIGS. 1 and 2 and wherein the maximum light therethrough at areas A and B of pick-ups 6 and 8 are displaced one fourth of a wavelength in phase. The light output from optical gratings 2 and 4 are applied to pick-up devices 6 and 8 respectively as shown in FIGS. 1 and 2, each pick-up device suitably comprising a photoelectric cell whose output is applied to an amplifier. The outputs of pick-ups 6 and 8 respectively are applied to pulse and shaping circuits 10 and 12, the latter circuits suitably comprising a stage such as a Schmitt trigger for shaping the output of its associated pick-up to a rectangular wave shape. The output of stage 10 which for convenience of description may be considered waveform A in FIG. 4 is applied to an amplifier 13 and an inverter 14, at the outputs of which there are respectively obtained waveforms A and $\overline{A}$. Amplifier 13 may suitably be two amplifying stages connected in cascade or a cathode follower or any other suitable arrangement which produces the same phase at its output as at its input. Inverter 14, of course, is intended to provide an output which is 180° displaced in phase with respect to its input, such readily being accomplished by a single stage amplifier or other suitable device.

The outputs of amplifier 13 and inverter 14 are respectively applied to differentiators, 16 and 18, the differentiators suitably being short time constant RC circuits. Diodes 20 and 22, poled as shown, insure that only the positive going pulses from the output of the differentiators appear at their outputs. The output of diode 22 is applied as one input to AND gates 24 and 26 and the output of diode 20 is applied as one input to AND gates 28 and 30.

Similarly, the output of stage 12 is applied to an amplifier 32 and an inverter 34, the latter stages being similar respectively to amplifier 13 and inverter 14. The outputs of amplifier 32 and inverter 34 are respectively applied to differentiators 36 and 38 which may be short time constant RC circuits such as differentiators 16 and 18, the outputs of differentiators 36 and 38 being applied to diodes 40 and 42 respectively. Diodes 40 and 42, being poled as shown, also pass therethrough only positive going pulses. The output of differentiator 36 is applied as an input to AND gates 48 and 50 and the output of differentiator 38 is applied as an input to AND gates 44 and 46.

The output of amplifier 13 is applied as the other input to AND gates 46 and 48, the output of inverter 14 is applied as the other input to AND gates 44 and 50, the output of amplifier 32 is applied as an input to AND gates 26 and 28, and the output of inverter 34 is applied as an input to AND gates 24 and 30. AND gates 24, 26, 28, 30, 44, 46, 48, and 50 may be the conventional coincidence circuit wherein the voltage of the output of the gate is substantially equal to the value of the lowest input voltage thereto.

The outputs of AND gates 26, 30, 44, and 48 are applied as inputs to an OR gate 52 and the outputs of AND gates 24, 28, 46, 50 are applied as inputs to an OR gate 54. OR gates 52 and 54 may suitably comprise the type of well known circuit wherein the value of the voltage appearing at its output is substantially equal to the value of the highest input voltage applied thereto. The outputs of OR gates 52 and 54 are applied to counters 56 and 58 respectively which may suitably be of the binary type.

The $+$ and $-$ signs depicted in the FIG. 4 on the respective output sides of the AND gates is intended to indicate whether the output of the AND gate is utilized to indicate positive or negative motion.

Considering the operation of the circuit of FIG. 4 reference is now also made to FIGS. 5 and 6. In connection with positive motion, i.e., the sequence of events tracing from left to right in FIG. 5, it is seen that the combinations $\dot{A}+$ and $\overline{B}$, $\dot{B}+$ and A, $\dot{A}-$ and B, and $\dot{B}-$ and $\overline{A}$ result in positive output pulses for positive motion. In FIG. 6, the combinations $\dot{B}+$ and $\overline{A}$, $\dot{A}+$ and B, $\dot{B}-$ and A, and $\dot{A}-$ and $\overline{B}$ result in output pulses for negative motion. Thus, during positive motion, the output at OR gate 52 is four sequentially occurring pulses for each unit of motion in the positive direction and during negative motion, the output at OR gate 54 is four sequentially occurring pulses for each unit of negative motion. During positive motion, accordingly, counter 56 is advanced four counts and during negative motion, counter 58 is advanced four counts. Alternatively a single reversible counter may be provided in lieu of separate counters 56 and 58.

During positive motion, there is no pulse output from OR gate 54 and during negative motion, there is no pulse output from OR gate 52. Thus, it is seen that the combinations which give counts during negative motion, viz., $\dot{B}+$ and $\overline{A}$, $\dot{A}+$ and B, $\dot{B}-$ and A, and $\dot{A}-$ and $\overline{B}$ provide low outputs at AND gates 24, 28, 46, and 50 whereby there is no output from OR gate 54. Similarly, during negative motion, the combinations which give positive motion, viz., $\dot{A}+$ and $\overline{B}$, $\dot{B}+$ and A, $\dot{A}-$ and B, and $\dot{B}-$ and $\overline{A}$ provide low outputs at gates 26, 30, 44, and 48 whereby there is no output from OR gate 52. It is thus seen from the circuit of FIG. 4 and the timing diagrams of FIG. 5 and FIG. 6 that a pulse indicating motion is obtained only at the coincidence of a pulse derived from the output of one pick-up and the high half portion of a wave derived from the output of the other pick-up.

To utilize the circuit of FIG. 4 with $n$ pick-ups where $n$ is greater than two, the only change necessary is to use $2n$ AND circuits, each having $n$ inputs, for the required combinations. The latter combinations can be determined quite easily from diagrams such as shown in FIGS. 5 and 6. In such situation, for example, where three pick-ups are used, each of 12 AND gates would have three inputs and two sets of six AND gates each would be utilized to provide the pulse outputs for positive and negative motion respectively.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. A position measuring arrangement comprising means responsive to motion of a member from a reference position to a different position to produce a plurality of like electrical wave trains spaced $\frac{1}{2}n$ wavelength apart, a single wave cycle representing a unit of motion, means for deriving a series of $2n$ pulses in response to a unit of motion by said member comprising means in circuit with said motion responsive means for deriving a pulse at each $\tfrac{1}{2}n$ wavelength point only when said motion is in one direction and for deriving a pulse at each $\tfrac{1}{2}n$ wavelength point only when said motion is in the opposite direction.

2. A position measuring arrangement comprising means responsive to motion of a member from a reference position to a different position for producing a plurality of like electrical wave trains spaced $\tfrac{1}{2}n$ wavelength apart, a single wave cycle representing a unit of motion, means for deriving a series of $2n$ pulses in response to a unit of motion by said member comprising first means in circuit with said motion responsive means for deriving a pulse at each $\tfrac{1}{2}n$ wavelength point only when said motion is in one direction and second means in circuit with said motion responsive means for deriving a pulse at each $\tfrac{1}{2}n$ wavelength point only when said motion is in the opposite direction.

3. A position measuring arrangement comprising means responsive to motion of a member from a reference position to a different position for producing a plurality of like electrical rectangular wave trains spaced $\tfrac{1}{2}n$ wavelength apart, a single wave cycle representing a unit of motion, means in circuit with said motion responsive means for deriving pulses occurring at the positive and negative going points of each of said waves, means in circuit with said pulse deriving means for producing a pulse at each of said points in response to the coincidence of the derived pulses with chosen respective phases of said waves to produce a series of pulses at each of said points respectively only when said motion is one direction, and means in circuit with said pulse deriving means for producing a pulse at each of said points in response to the coincidence of the derived pulses with chosen other respective phases of said waves to provide a series of pulses at each of said points respectively only when said motion is in the opposite direction.

4. A position measuring arrangement comprising means responsive to motion of a member from a reference position to a different position for producing a plurality of like electrical rectangular wave trains spaced $\tfrac{1}{2}n$ wavelength apart, a single wave cycle representing a unit of motion, means in circuit with said motion responsive means for deriving pulses occurring at the positive and negative going points of each of said waves, means in circuit with said pulse deriving means for producing a pulse at each of said points in response to the coincidence of the derived pulses with chosen respective phases of said waves to provide a series of pulses only when said motion is in one direction, and means in circuit with said pulse deriving means for producing a pulse at each of said points in response to the coincidence of the derived pulses with the respective complements of said chosen phases to provide a series of pulses at each of said points only when said motion is in the opposite direction.

5. A position measuring arrangement comprising means responsive to motion of a member from a reference position to a different position to produce two like electrical wave trains spaced one-fourth wavelength apart, a single wave cycle representing a unit of motion, means in circuit with said motion responsive means for deriving a pulse at the positive and negative going points of each of said waves, means in circuit with said pulse deriving means responsive to the coincidence of the pulses derived from each wave with a chosen phase of the other wave respectively to produce a series of four pulses for each unit of motion in one direction and means in circuit with said pulse deriving means responsive to the coincidence of the pulses derived from each wave with the complement of said chosen phases of the other waves respectively to produce a series of four pulses for each unit of motion in the opposite direction.

6. The position measuring arrangement defined in claim 5 wherein said wave train producing means includes means for producing two like electrical signals spaced one-fourth wavelength apart and means in circuit with said electrical signal producing means for converting said signals into like rectangular wave trains.

7. The position measuring arrangement defined in claim 6 wherein said means for producing said electrical signals includes optical means for providing two maximum light intensities spaced one-fourth wavelength apart and two corresponding photosensitive devices for producing said signals in response to said light intensities.

References Cited in the file of this patent

UNITED STATES PATENTS

| | | |
|---|---|---|
| 2,016,036 | Fitz Gerald | Oct. 1, 1935 |
| 2,142,378 | Sachtleben | Jan. 3, 1939 |
| 2,439,295 | Hammond et al. | Apr. 6, 1948 |
| 2,788,519 | Caldwell | Apr. 9, 1957 |
| 2,819,645 | Koulikovitch | Jan. 14, 1958 |
| 2,857,802 | Cail | Oct. 28, 1958 |
| 2,886,717 | Williamson et al. | May 12, 1959 |
| 2,886,718 | Shepherd et al. | May 12, 1959 |
| 2,938,126 | Adler | May 24, 1960 |
| 2,979,623 | Fowell | Apr. 11, 1961 |
| 3,001,081 | Bower | Sept. 19, 1961 |
| 3,036,219 | Thompson | May 22, 1962 |

FOREIGN PATENTS

| | | |
|---|---|---|
| 118,539 | Russia | May 16, 1959 |